United States Patent
Lytle, II et al.

(10) Patent No.: US 8,063,346 B2
(45) Date of Patent: Nov. 22, 2011

(54) VIRTUAL IMAGE PROJECTOR

(75) Inventors: David R. Lytle, II, Addison, IL (US);
David J. Stack, Mt. Prospect, IL (US);
Joseph Wieczorek, Palatine, IL (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 570 days.

(21) Appl. No.: 12/118,192

(22) Filed: May 9, 2008

(65) Prior Publication Data
US 2009/0279154 A1   Nov. 12, 2009

(51) Int. Cl.
*H04K 3/00*   (2006.01)
*F41G 7/00*   (2006.01)

(52) U.S. Cl. ............... 244/3.1; 342/13; 89/1.11; 359/1; 359/896; 455/1

(58) Field of Classification Search ............ 244/3.1–3.3; 89/1.11; 455/1; 342/1–20, 190–197; 359/1–35, 359/896
See application file for complete search history.

(56) References Cited

U.S. PATENT DOCUMENTS

| | | | |
|---|---|---|---|
| 3,820,895 A | | 6/1974 | Mihail et al. |
| 4,231,533 A | * | 11/1980 | Durig ............................ 244/3.16 |
| 4,277,137 A | * | 7/1981 | Upatnieks et al. ........... 244/3.17 |
| 4,419,669 A | | 12/1983 | Slager et al. |
| 4,516,743 A | * | 5/1985 | Sweeney et al. ............. 244/3.13 |
| 4,602,257 A | * | 7/1986 | Grisham ............................ 359/9 |
| 4,716,417 A | * | 12/1987 | Grumet ............................. 342/2 |
| 4,783,134 A | * | 11/1988 | Hara et al. ......................... 359/7 |
| 5,661,555 A | * | 8/1997 | Romer et al. ................ 244/3.13 |
| 5,742,384 A | | 4/1998 | Farmer |
| 6,377,238 B1 | | 4/2002 | McPheters |
| 6,452,532 B1 | * | 9/2002 | Grisham ....................... 342/191 |
| 6,825,791 B2 | | 11/2004 | Sanders et al. |
| 6,958,813 B1 | | 10/2005 | Ahmadjian et al. |
| 7,232,240 B2 | * | 6/2007 | Kosnik et al. .................... 342/14 |
| 2005/0100077 A1 | | 5/2005 | Rosen et al. |
| 2007/0090228 A1 | | 4/2007 | Kisletsov et al. |
| 2008/0018519 A1 | | 1/2008 | Berg et al. |
| 2008/0027647 A1 | | 1/2008 | Ansell et al. |

FOREIGN PATENT DOCUMENTS

EP    1 093 932 A1    4/2001
RU    2141094 C1    11/1999

OTHER PUBLICATIONS

International Search Report for corresponding PCT/US2009/043315, completed Jun. 19, 2009 by Blaine R. Copenheaver of the USPTO.

* cited by examiner

*Primary Examiner* — Bernarr Gregory
(74) *Attorney, Agent, or Firm* — Tarolli, Sundheim, Covell & Tummino LLP

(57) ABSTRACT

Systems and methods are provided for projecting a virtual image of an object. A projector mounted on the object for projecting a light beam. A photographic plate is provided that includes an interference pattern imprinted onto at least one surface, wherein the interference pattern manipulates the light to form a hologram beam such that a detector detecting the hologram beam detects a virtual image of the object that has a light signature at a greater intensity than a light signature of the object.

20 Claims, 5 Drawing Sheets

US 8,063,346 B2

VIRTUAL IMAGE PROJECTOR

TECHNICAL FIELD

The present invention relates generally to projection systems, and more particularly to systems and methods for projecting a virtual image of an object.

BACKGROUND OF THE INVENTION

Holography is a technique for recording and later reconstructing the amplitude and phase distribution of a coherent wave disturbance. Generally, the technique utilized for producing a holographic element is accomplished by imprinting a pattern of interference between two optical beams or waves. Holography was developed for displaying three-dimensional images. The beams, one reflected from an object, called the object beam and a second beam that bypasses the object is called the reference beam, are used to record the information in light sensitive recording medium, such as a holographic film or plate.

SUMMARY OF THE INVENTION

In accordance with an aspect of the present invention, a projector system is provided for projecting a virtual image of an object. A projector is mounted on the object for projecting a light beam. A photographic plate is provided that includes an interference pattern imprinted onto at least one surface, wherein the interference pattern manipulates the light beam to form a hologram beam such that a detector detecting the hologram beam detects a virtual image of the object that has a light signature at a greater intensity than a light signature of the object.

In accordance with another aspect of the present invention, a system is provided for providing a virtual image of an object to a detector. Means for providing a hologram beam from the object at a first location are included. Means for redirecting the hologram light beam toward the detector are also included. The hologram beam causes the detector to detect the virtual image of the object at a second location spaced apart from the first location, wherein the virtual image of the object has a light signature with a greater intensity than a light signature of the object.

In accordance with yet another aspect of the present invention, a method is provided for protecting an object. An incoming threat is detected at the object in a first location. At least a portion of a projection system of the object is aligned toward the threat. A hologram beam is projected toward the threat that causes the threat to detect a virtual image of the object a second location, the second location being spaced apart from the first location, wherein the virtual image of the object has a light signature with a greater intensity than a light signature of the object.

DETAILED DESCRIPTION OF THE INVENTION

The present system relates to a virtual image projection system that can be mounted on a valuable asset, such as an in-orbit satellite. The valuable asset can detect an incoming threat, such as a guided missile. The valuable asset can direct a projection system toward the incoming threat and project a hologram beam that causes the incoming threat to detect a virtual image of the valuable asset. Upon detection of the virtual image, the threat changes its trajectory toward the virtual image of the valuable asset, thereby missing the valuable asset.

Figure 1:
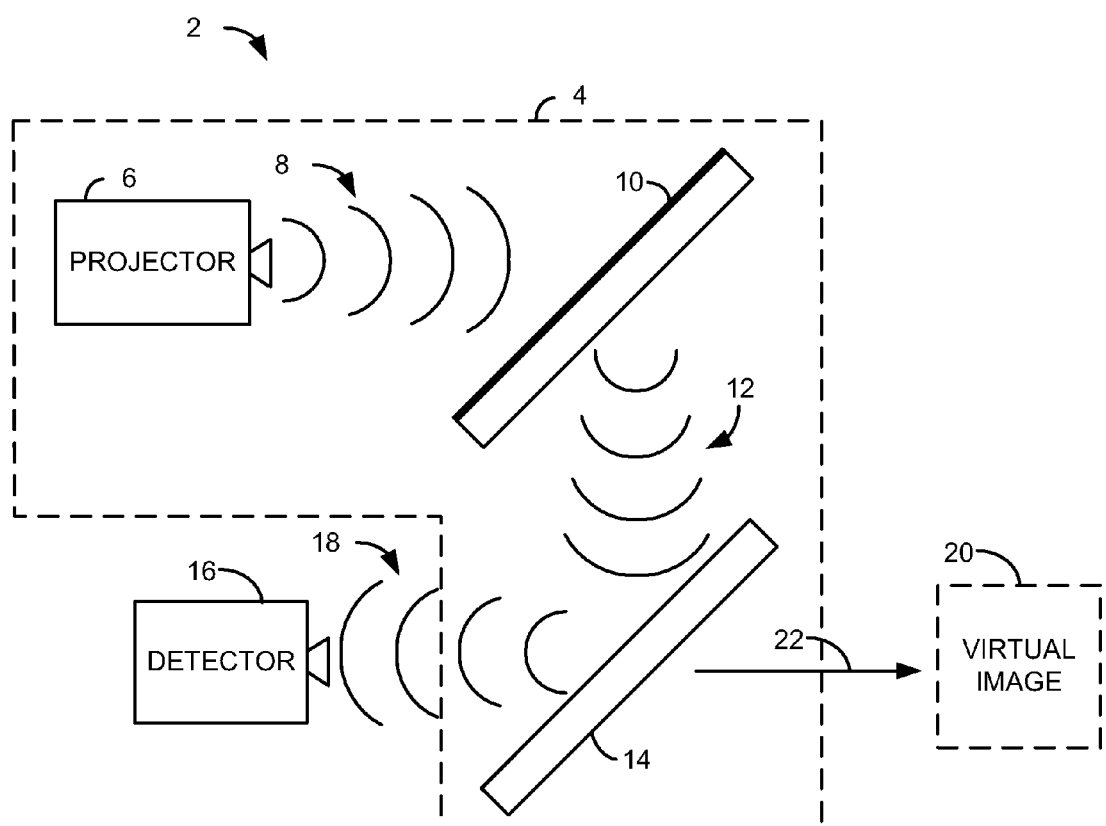
FIG. 1 illustrates an exemplary scenario that includes a projection system for projecting a virtual image of an object to a detector in accordance with an aspect of the invention.

FIG. 1 illustrates an example of a scenario 2 that includes a virtual image projection system 4 in accordance with an aspect of the invention. The virtual image projection system 4 includes a projector 6 that can project a light beam, which can be referred to as a reconstruction beam 8, onto a photographic plate 10 at an angle of incidence (e.g., about 45 degrees) for the photographic plate 10. The photographic plate 10 has an interference pattern of an object (e.g., a valuable asset such as a satellite) imprinted on at least one side of the photographic plate 10. The virtual image projection system 4 can be configured such that when the projector 6 projects the reconstruction beam 8 onto the photographic plate 10 the photographic plate 10 manipulates the reconstruction beam 8 to create a hologram beam 12. The hologram beam 12 can have a wavelength of about 8-10 micrometers (e.g., an infrared beam) or about 450 micrometers (e.g., an ultraviolet beam). Additionally, or alternatively, the hologram beam 12 could have multiple wavelengths, or the wavelength of the hologram beam 12 could be in a different wave band, such as the visible light wave band. The hologram beam 12 can be provided to a folding mirror 14. The folding mirror 14 can be implemented, for example, as a mirror with an adjustable position relative to the photographic plate 10. The folding mirror 14 could be controlled, for example, with an electric motor (not shown).

The virtual image projection system 4 can be designed such that the folding mirror 14 reflects the hologram beam 12 toward a detector 16. The detector 16 could be mounted, for example, on a threat to the valuable asset. The threat could be implemented as a self-guided projectile, such as a guided missile, smart bomb, smart munitions, etc. The detector 16 could be implemented, for example, as an ultraviolet (UV) or infrared (IR) detector. One skilled in the art will appreciate, however, that the detector 16 could be configured to include other wavebands as well. When the reflected hologram beam 18 is provided to the detector 16, the detector 16 perceives a virtual image 20 of the object in a direction generally opposite to a trajectory of the reflected hologram beam 18, which direction is indicated by the arrow at 22. The virtual image 20 can be at about one coherence length away from the object, such as about 1 kilometer.

Figure 2:
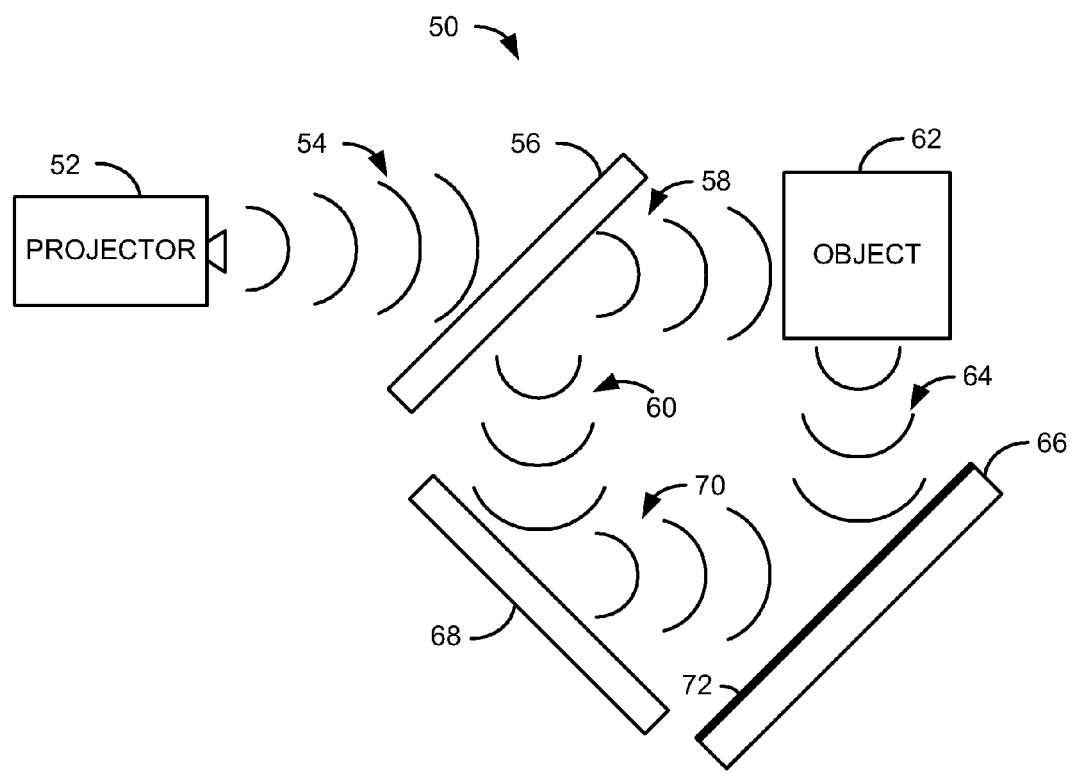
FIG. 2 illustrates an exemplary system for imprinting an interference pattern onto a photographic plate in accordance with an aspect of the invention.

FIG. 2 illustrates an example of a system 50 for storing a virtual image in accordance with an aspect of the invention. The system 50 includes a projector 52 that can project light beams 54 onto a beam splitter 56. The beam splitter 56 could be implemented, for example, as a half-silvered mirror, a plate of glass with a pellicle film, a configuration of prisms, etc. The beam splitter 56 could be configured such that light beams 54 incident at about 45 degrees to the beam splitter 56 can be split such that about one half of the light beams 54 are transmitted as transmitted beams 58 and about one half are reflected as reflected beams 60.

The transmitted beams 58 can be directed to an object 62. The object 62 can be, for example, a valuable asset (e.g., a satellite, an aircraft, a mobile vehicle, etc.) or a model of a valuable asset. Some portion of the transmitted beams 58 can be reflected by the object 62 (referred to as an object beam 64) onto a photographic plate 66. The photographic plate 66 could be implemented, for example, as a metal plate coated with photographic film. Alternatively, the photographic plate 66 can be implemented as an emulsion of salt applied to a glass plate. One skilled in the art will appreciate the various structures that could be used to implement the photographic plate 66. Additionally, the reflected beams 60 can be provided to a mirror 68 that can reflect the reflected beams 60 (referred to as a reference beam 70) onto the photographic plate 66.

The reference beam 70 and the object beam 64 are coherent since both the reference beam 70 and the object beam 64 originated from the light beams 54 provided by the projector 52. Due to the coherency of the object beam 64 and the reference beam 70, optical interference between the reference beam 70 and the object beam 64 produces a series of intensity fringes that can be imprinted on the photographic plate 66. These fringes imprint a type of diffraction grating on the film, which can be referred to as an interference pattern 72. When the photographic plate 66 is later illuminated by a substitute reference beam (not shown), the object beam 64 is reconstructed, producing a three dimensional virtual image of the object 62.

Figure 3:
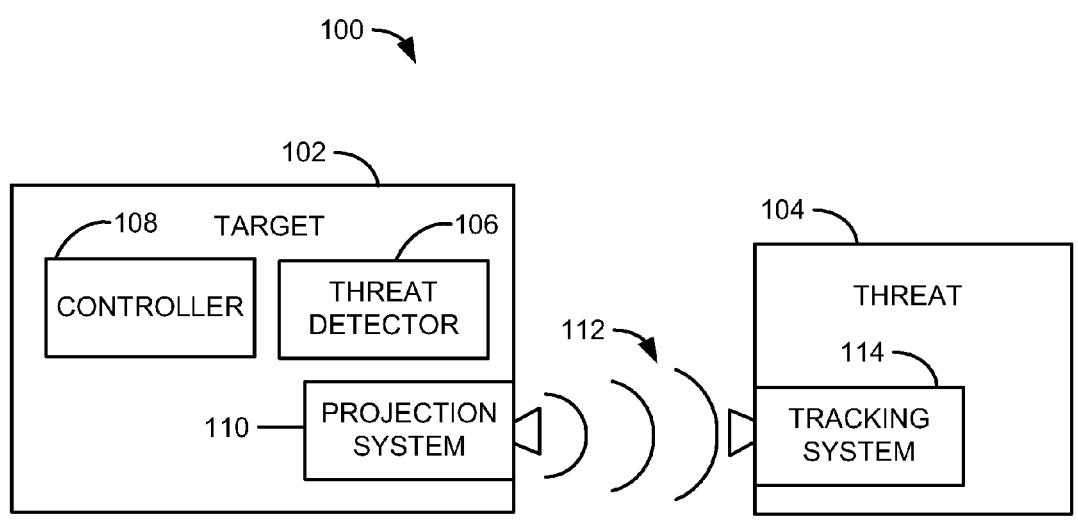
FIG. 3 illustrates another exemplary scenario for implementing a projection system in accordance with an aspect of the invention.

FIG. 3 illustrates another exemplary scenario 100 of a target 102 and a threat 104 in accordance with an aspect of the invention. The target 102 could be, for example, a valuable asset, such as an in-orbit satellite, an aircraft, a vehicle, etc. The threat 104 could be, for example, a guided missile, a smart bomb, guided munitions, etc. The target 102 can include, for example, a threat detector 106. The threat detector 106 could be implemented, for example, as an IR or UV detector that can detect the presence of an incoming threat, such as the threat 104. For instance, the threat detector 106 can detect a plume of the threat 104. In such a situation, the threat detector 106 can determine location information for the threat 104. Alternatively, the threat detector 106 could be implemented as software and/or hardware that processes a signal from a ground station that warns the target 102 of the threat 104. The incoming signal can include, for example, location information of the threat 104. The location information can be implemented, for example, as coordinates (e.g., longitude, latitude and altitude) of the threat 104.

When the threat 104 is detected, the threat detector 106 can provide the location information to a controller 108 that enables the controller 108 to determine a trajectory of the threat 104. The location information can be provided continuously or intermittently. The controller 108 can employ the location information to control a projection system 110 mounted on the target 102. The projection system 110 could be implemented, for example as the projection system 4 illustrated in FIG. 1. The controller 108 can activate a projector of the projection system 110, and move a folding mirror of the projection system 110 and/or a turret to which the projection system 110 is mounted to direct a hologram beam 112 toward the threat 104.

The threat 104 can include, for example a tracking system 114. The tracking system 114 can include, for example, a UV or IR detector to guide the threat 104 toward the target 102. However, when the threat 104 receives the hologram beam 112 from the projection system 110 of the target 102, the threat 104 perceives a virtual image of the target 102. The hologram beam 112 can be provided with an intensity such that the virtual image of the target 102 has a greater intensity light signature than a light signature of the target 102 such that the virtual image of the target 102 can be perceived as brighter (in the IR and/or UV spectrum) than the target 102 by the threat 104. Accordingly, the threat 104 will be diverted toward a perceived location of the virtual image, which can be about 1 kilometer away from the target 102. Thus, the threat 104 will miss the target 102 entirely, such that the target 102 remains undamaged.

Figure 4:
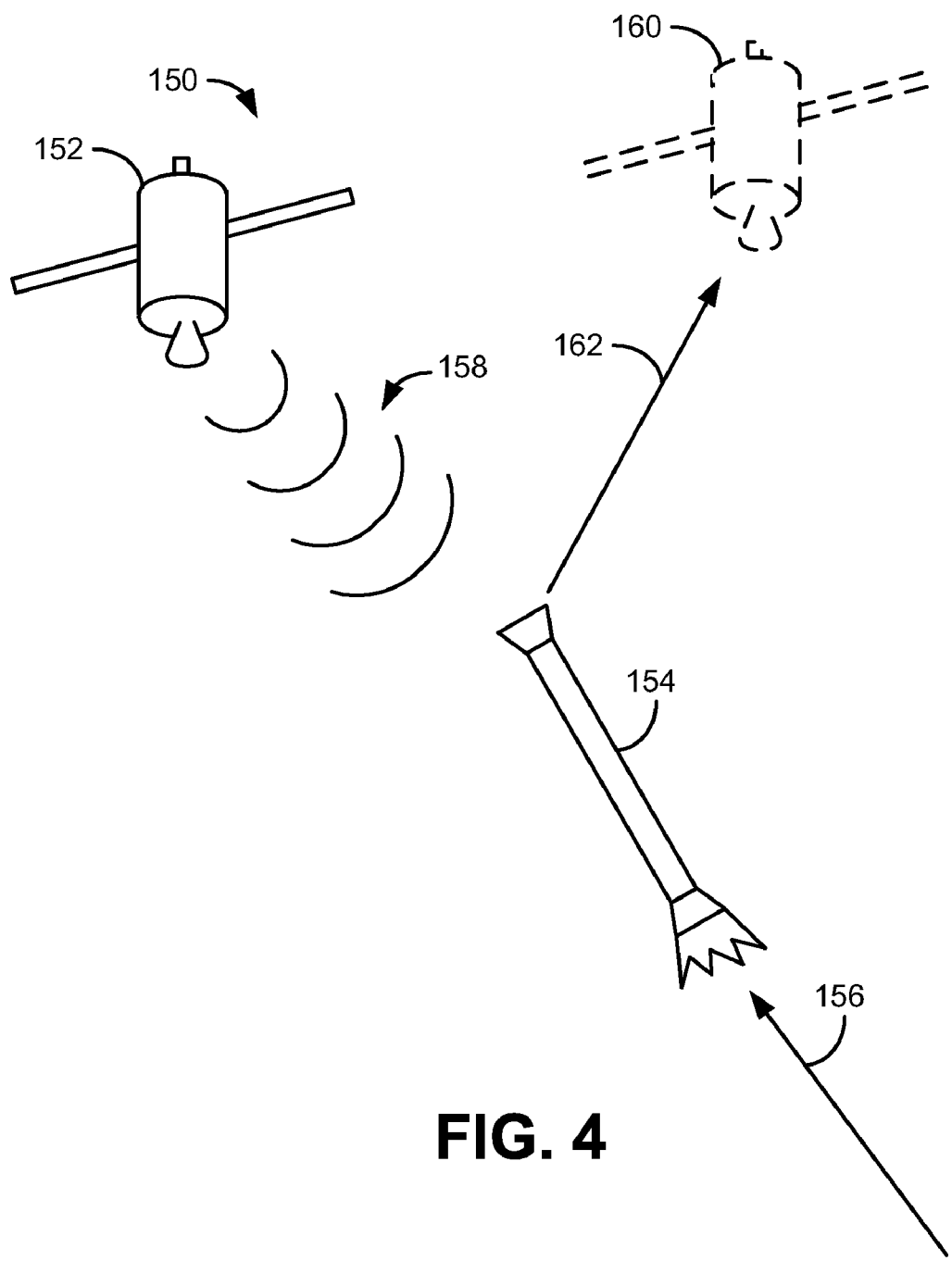
FIG. 4 illustrates yet another exemplary scenario for implementing a projection system in accordance with an aspect of the invention.

FIG. 4 illustrates yet another exemplary scenario 150 that includes an in-orbit satellite 152 (e.g., a target and/or valuable asset) and an incoming guided missile 154 (e.g., a threat) that employs a projection system (such as the virtual image projection system 4 illustrated in FIG. 1) in accordance with an aspect of the invention. In the present exemplary scenario 150, the incoming guided missile 154 travels in a trajectory toward the satellite 152 indicated by an arrow at 156. The satellite 152 is configured to detect the incoming guided missile 154, for example, with a threat detector as discussed with respect to FIG. 3. Once detected, the satellite 152 is configured to project a hologram beam 158 toward the incoming guided missile 154. In response to receiving the hologram beam 158, the incoming guided missile 154 perceives a virtual image of the satellite 160 spaced apart from the satellite 152 by about 1 kilometer.

The hologram beam 158 can be provided at an intensity such that a light signature of the virtual image of the satellite 152 will have a greater intensity in the UV and/or IR spectrum than the satellite 152 itself, such that the incoming guided missile 154 will perceive the virtual image of the satellite 160 to be the location of the satellite 152. Accordingly, the incoming guided missile 154 will be diverted toward the virtual image of the satellite 160, indicated by an arrow at 162. Once diverted, the incoming guided missile 154 will miss the satellite 152, such that satellite 152 is undamaged by the incoming guided missile 154.

Figure 5:
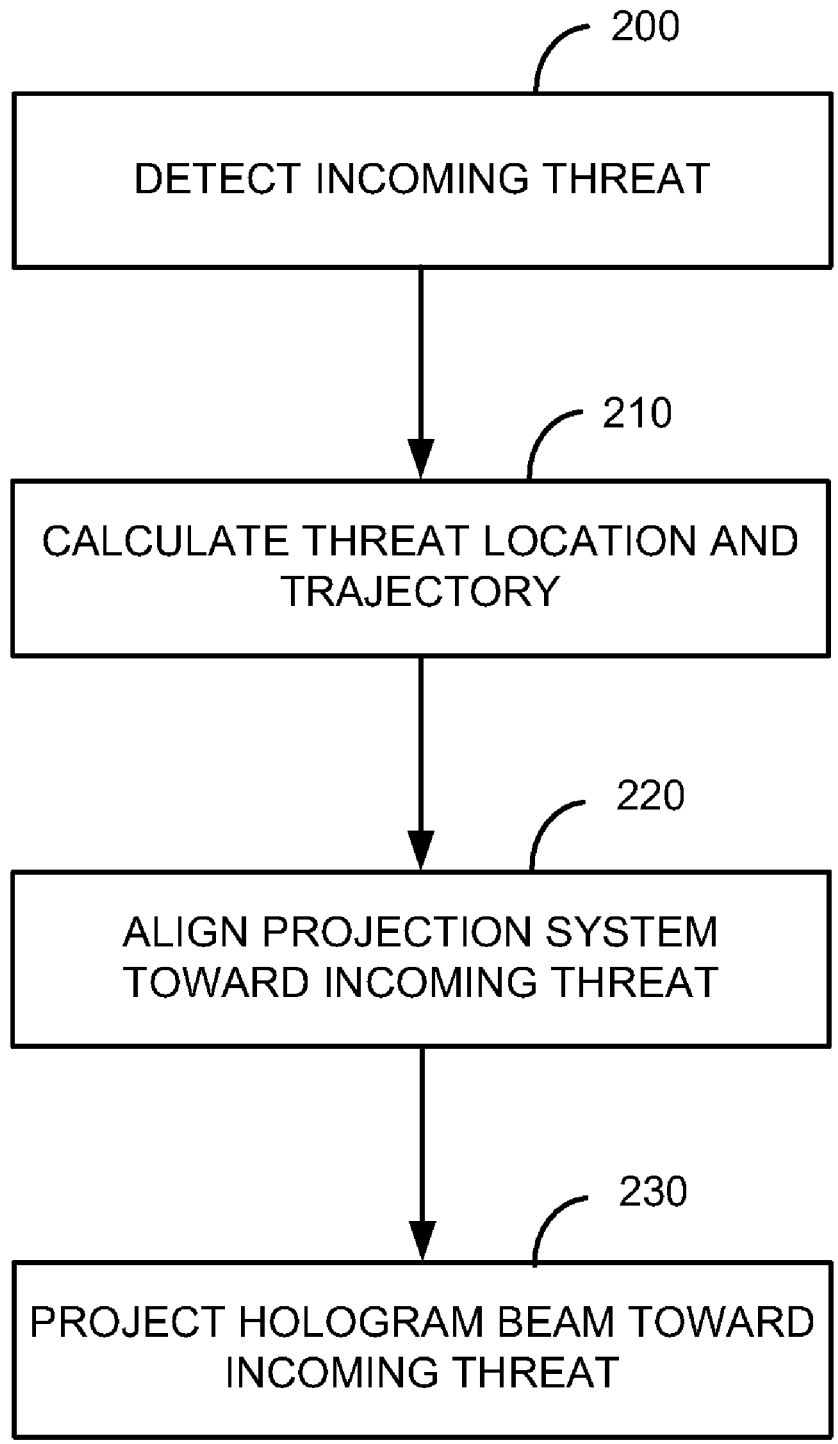
FIG. 5 illustrates an exemplary methodology for protecting a valuable asset in accordance with an aspect of the invention.

In view of the foregoing structural and functional features described above, methodologies will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates a methodology for protecting a valuable asset (e.g., an in-orbit satellite, an aircraft, a vehicle, etc.) in accordance with an aspect of the invention. At 200, an incoming threat (e.g., a guided missile, a smart bomb, guided munitions, etc.) is detected at the valuable asset. The threat could be detected, for example, with a threat detector of the valuable asset. The threat detector can provide, for example, location information that can identify a location and/or a trajectory of the incoming threat to a controller of the valuable asset.

At 210, the controller of the valuable asset analyzes the location information to calculate the location and/or trajectory of the incoming threat. At 220, the controller aligns an image projection system toward the incoming threat. The aligning can include, for example, aligning a turret to which the projection system is mounted and/or aligning a folding mirror of the projection system. At 230, the controller causes the projection system to project a hologram beam toward the threat. The hologram beam causes the threat to detect a virtual image of the valuable asset. The hologram image can be provided with an intensity that causes a light signature of the valuable asset to be greater than an intensity of a light signature of the valuable asset. Upon detection of the virtual image, the trajectory of the threat is altered toward the perceived location of the virtual image, thereby causing the threat to miss the valuable asset.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

Having described the invention, the following is claimed:

1. A projector system for projecting a virtual image of an object, the system comprising:
   a projector mounted on the object for projecting a light beam; and
   a photographic plate that includes an interference pattern imprinted onto at least one surface, wherein the interference pattern manipulates the light beam to form a hologram beam such that a threat including a detector that receives the hologram beam detects a virtual image of the object that has a light signature at a greater intensity than a light signature of the object, thereby causing the threat to be diverted toward a perceived location of the virtual image.

2. The system of claim 1, wherein the system further includes a minor that is controllable to reflect the hologram beam toward the detector.

3. The system of claim 2, wherein the object is an in-orbit satellite, and the virtual image of the object is a virtual image of a satellite.

4. The system of claim 3, wherein the perceived location of the virtual image of the satellite is spaced apart from the in-orbit satellite.

5. The system of claim 3, wherein the perceived location of the virtual image of the satellite is spaced apart from the satellite by about one coherence length of the light beam.

6. The system of claim 3, wherein the perceived location of the virtual image of the satellite is spaced apart from the in-orbit satellite by at least 0.5 kilometers.

7. The system of claim 1, wherein the hologram beam is an infrared light beam.

8. The system of claim 1, wherein the hologram beam is an ultraviolet light beam.

9. The system of claim 1, wherein the photographic plate comprises a metal plate coated with a photographic film on the at least one surface.

10. The system of claim 1, wherein the threat is a guided projectile.

11. The system of claim 1, wherein the hologram beam is a visible light beam.

12. A system for providing a virtual image of an object to a threat, the system comprising:
    means for providing a hologram beam from the object at a first location;
    means for redirecting the hologram beam toward a detector implemented on the threat, wherein the hologram beam causes the detector to detect a virtual image of the object at a second location spaced apart from the first location, wherein the virtual image of the object has a light signature with a greater intensity than a light signature of the object, thereby diverting the threat toward the second location.

13. The system of claim 12, wherein the first location is spaced apart from the second location by at least 0.5 kilometers.

14. The system of claim 12, wherein the threat is a guided projectile.

15. A method for protecting an object, the method comprising:
    detecting an incoming threat at the object in a first location;
    aligning at least a portion of a projection system of the object toward the threat; and
    projecting a hologram beam to a detector implemented on the threat that causes the detector of the threat to detect a virtual image of the object at a second location, the second location being spaced apart from the first location, wherein the virtual image of the object has a light signature with a greater intensity than a light signature of the object, thereby causing the threat to be diverted toward the second location.

16. The method of claim 15, wherein the detector is mounted on a guided projectile traveling toward the first location and the method further comprises calculating a trajectory for the guided projectile, wherein the aligning of the projection system is based on the calculated trajectory.

17. The method of claim 15, wherein aligning at least a portion of a projection system of the object toward the threat further comprises aligning a mirror of the projection system.

18. The method of claim 15, wherein the first location is spaced apart from the second location by at least 0.5 kilometers.

19. The method of claim 15, wherein the hologram beam has a wavelength in the ultraviolet electro-magnetic spectrum.

20. The method of claim 15, wherein the hologram beam has a wavelength in the infrared electro-magnetic spectrum.

* * * * *